(12) United States Patent
Keskes et al.

(10) Patent No.: US 6,970,788 B2
(45) Date of Patent: Nov. 29, 2005

(54) METHOD OF KEYING A BOREHOLE IN A SEISMIC BLOCK

(75) Inventors: Naamen Keskes, Pau (FR); Frederic Mansanne, Pau (FR)

(73) Assignee: TOTAL S.A., Courbevoie (FR)

( * ) Notice: Subject to any disclaimer, the term of this patent is extended or adjusted under 35 U.S.C. 154(b) by 82 days.

(21) Appl. No.: 10/661,727

(22) Filed: Sep. 12, 2003

(65) Prior Publication Data

US 2005/0192682 A1 Sep. 1, 2005

(30) Foreign Application Priority Data

Sep. 12, 2002 (EP) .................................. 02292246

(51) Int. Cl.$^7$ .............................................. G01V 1/28

(52) U.S. Cl. ........................................... 702/14; 702/9

(58) Field of Search .............................. 702/6, 7, 14, 9; 703/5, 10

(56) References Cited

U.S. PATENT DOCUMENTS

| | | | |
|---|---|---|---|
| 5,812,493 A | | 9/1998 | Robein et al. ................. 367/25 |
| 5,838,634 A | * | 11/1998 | Jones et al. ..................... 367/73 |
| 6,236,943 B1 | * | 5/2001 | Aminzadeh et al. ........... 702/14 |
| 6,298,351 B1 | * | 10/2001 | Castelli et al. ................ 707/102 |
| 6,374,185 B1 | * | 4/2002 | Taner et al. ...................... 702/6 |
| 6,662,112 B2 | * | 12/2003 | Eastwood et al. ............. 702/14 |
| 2002/0120429 A1 | * | 8/2002 | Ortoleva ........................ 703/2 |

FOREIGN PATENT DOCUMENTS

FR 2737909 2/1997

OTHER PUBLICATIONS

Essenreiter, R.et al., "Identification and Classification of Multiple Reflections With Self-Organizing Mapes", Geophysical Prospecting v 49 n 3, Apr. 2001, p. 341-352.*

Taner M T, et al., "Reservoir Characterization By Calibration Of Self-Organizing Map Clusters", 71st Annu Seg Int Mtg San Antonio, Tx, Sep. 9-14, 2001, Expanded Abstr Biogr V 2, pp 1552-1555.*

Chun Che Fung et al., "Modular Artifical Neural Network for Prediction of Petrphysical Properties From Well Log Data", IEEE Transactions on Instrumentation and Measurement, vol. 46, No. 6, Dec. 1997, pp. 1295-1299.*

M. Turhan Taner, Kohonen's Self Organizing Maps and their use in Interpretation, Rock Solid Images, Nov. 1997, p. 1-7.*

M. Turhan Taner, Kohonen's Self Organizing Maps and their use in Interpretation, Siesmic Research Corp., Nov. 1997, p. 1-7.*

Joel D. Walls, et al., "North Sea Reservoir Characterization Using Rock Physics, Seismic Attributes, and Neural Networks; A Case History", Annual Meeting Abstracts—Soc. of Exploration Geophysicists, 1999, pp. 1572-1575.*

* cited by examiner

Primary Examiner—Donald McElheny, Jr.
(74) Attorney, Agent, or Firm—Baker Botts L.L.P.

(57) ABSTRACT

The aim of the present invention is the determination of the best possible correlation (keying) for electric recordings obtained in a borehole with seismic recordings obtained in a volume of subsoil (the seismic block) containing the bore. This is accomplished by defining in a neighborhood of the trajectory of the bore a set of layered networks, the entries of which are the seismic signals and the exits of which are electric signals. Accordingly, a quality measure is awarded with regard to the convergence. The best convergence quality then permits the determination of the best place in the neighborhood which produces the best keying.

2 Claims, 7 Drawing Sheets

Behavior of the network: rate of convergence

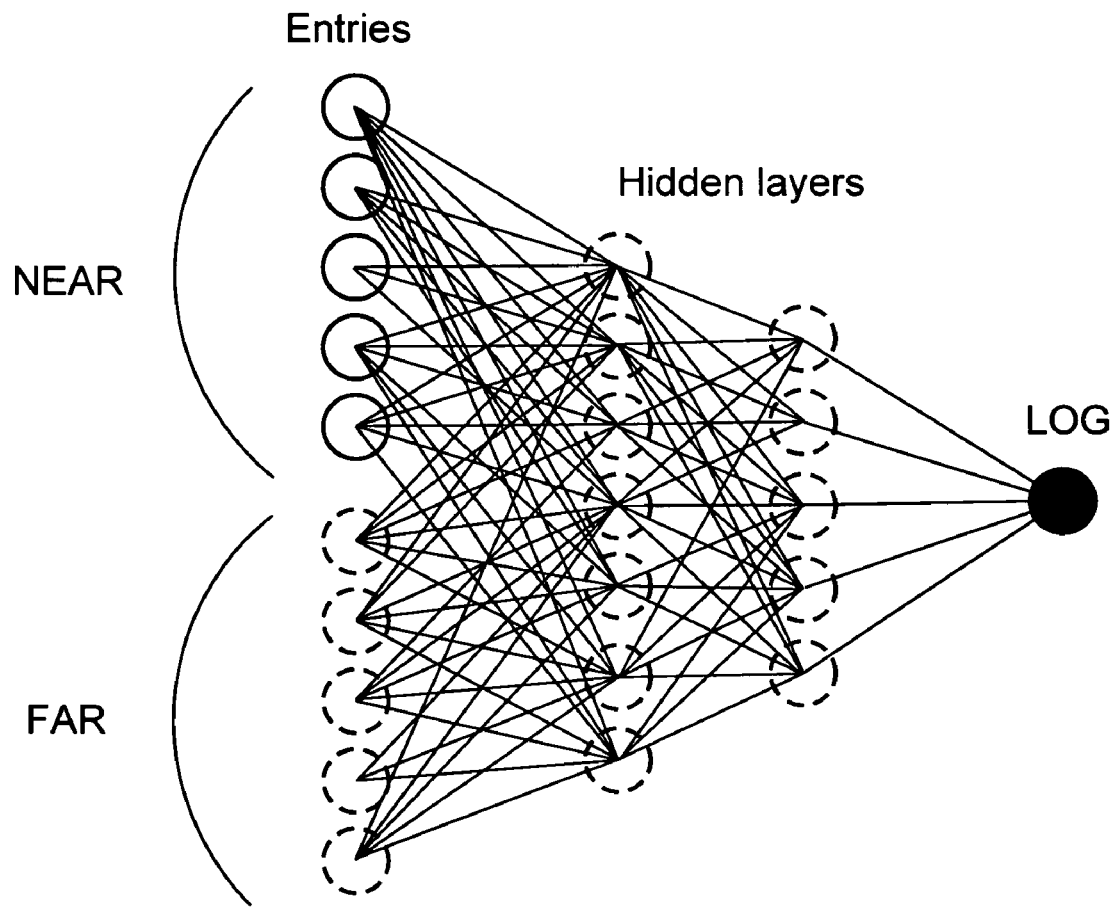
F I G. 6

METHOD OF KEYING A BOREHOLE IN A SEISMIC BLOCK

BACKGROUND OF THE INVENTION

The present invention relates to a method of keying a borehole in a multi-attributes seismic block, that it is to say it aims to obtain the best position of a drilling trajectory in the seismic block.

STATE OF THE ART

The method according to the invention applies to seismic blocks. A seismic block is formed by the juxtaposition of seismic traces in a volume. The term "seismic section" refers to a slice of seismic block. A seismic section offers a view of the juxtaposition of the seismic traces contained in the cutting plane. In a seismic image, the luminous intensity of a pixel is proportional to the represented seismic attribute.

The keying of a borehole in a seismic domain has already been the subject of some works.

In particular, patent FR-A-2 737 909 proposes a method of positioning a drilling trajectory on a seismic section by the modelling in a synthetic sum domain of locations of the trajectory for which the pair (dip, azimuth) is known then by migration in time of the synthetic image.

This method allows the bore to be placed on a seismic section by a deterministic calculation method.

Other calculation methods have been proposed. However, they are all deterministic.

CONTRIBUTION OF THE INVENTION

The approach of the method according to the invention is non-deterministic in nature. It is accepted that any measurement is marred by error and the intention is to determine the best possible keying by a scanning of all the keying possibilities in order to select the best of them.

The method according to the invention determines the value of the keying through the convergence quality in learning phase of a set of neural networks.

The novelty lies in the fact that the neural networks are not only used as universal estimators but also as measuring instruments.

Thus each network produces a "distance" keying measurement and the best keying is determined by the minimum distance.

This operation is analogous to the selection of the minimum distance from a set of distance measurements taken with any measuring instrument, such as a graduated rule.

DEFINITION OF THE INVENTION

The subject of the present invention is a method of keying, in a space presenting two spatial dimensions and one temporal dimension, a signal S measured in positions U subject to an uncertainty, on a set of N signals measured in determined positions, the N+1 signals having their temporal origin in a same plane, the said method involving:

re-sampling the N+1 signals in order to place them all in an identical sampling range, filtering the signal S in order to place it in a range of frequencies that is identical to that of the N signals, and characterized in that it also involves:

defining for each position U associated with the measurements of the signal S a same neighbourhood of places V in the spatia-temporal space centred on the position U, producing a layered neural network $RN^V$ for each location V in the neighbourhood of U, each network having an entry vector of dimension N associated with the measurements of the N signals and a scalar exit associated with a measurement of the signal S, for each neural network $RN^V$, defining a learning set such that the entries are the collection of all the vectors of measurements of the N signals situated at locations V and the exits are the collection of the values of the signal S at positions U for all the positions U, fixing a predetermined number of iterations Nit for all the neural networks and launching the learning phases of all the networks, for each neural network $RN^V$, calculating the value of the integral $\Sigma^v$ of the function giving the error committed by the network at each iteration, from iteration 1 to iteration Nit, for each surface spatial position $V_k$ of the neighbourhood with coordinates (Xk, Yk, t0). selecting in the time dimension the pair of locations $V1_k$ $(x_k,y_k,t_0)$, $V2_k$ $(x_k,y_k,t_2)$ of the neighbourhood which correspond to the two smallest local minima of the two integrals ($\Sigma^{v1}_k$, $\Sigma^{v2}_k$), for each surface spatial position Vk of the neighbourhood, retaining from among the two positions $V1_k$ $(x_k,y_k,t_0,)$ and $V2_k$ $(x_k,y_k,t_2)$ the position $V_m$, for which the signal estimated by the respective neural networks RNVlk and $RN^{v2}_k$ presents a maximum variance, choosing from among the positions $V_m$ the position $V_{ca1}$ for which the integral $\Sigma^v_m$ is minimum.

FIGURES

FIG. 6 presents a neural network in which the entries have come from a time window taken on the seismic signals.

Figure 7:
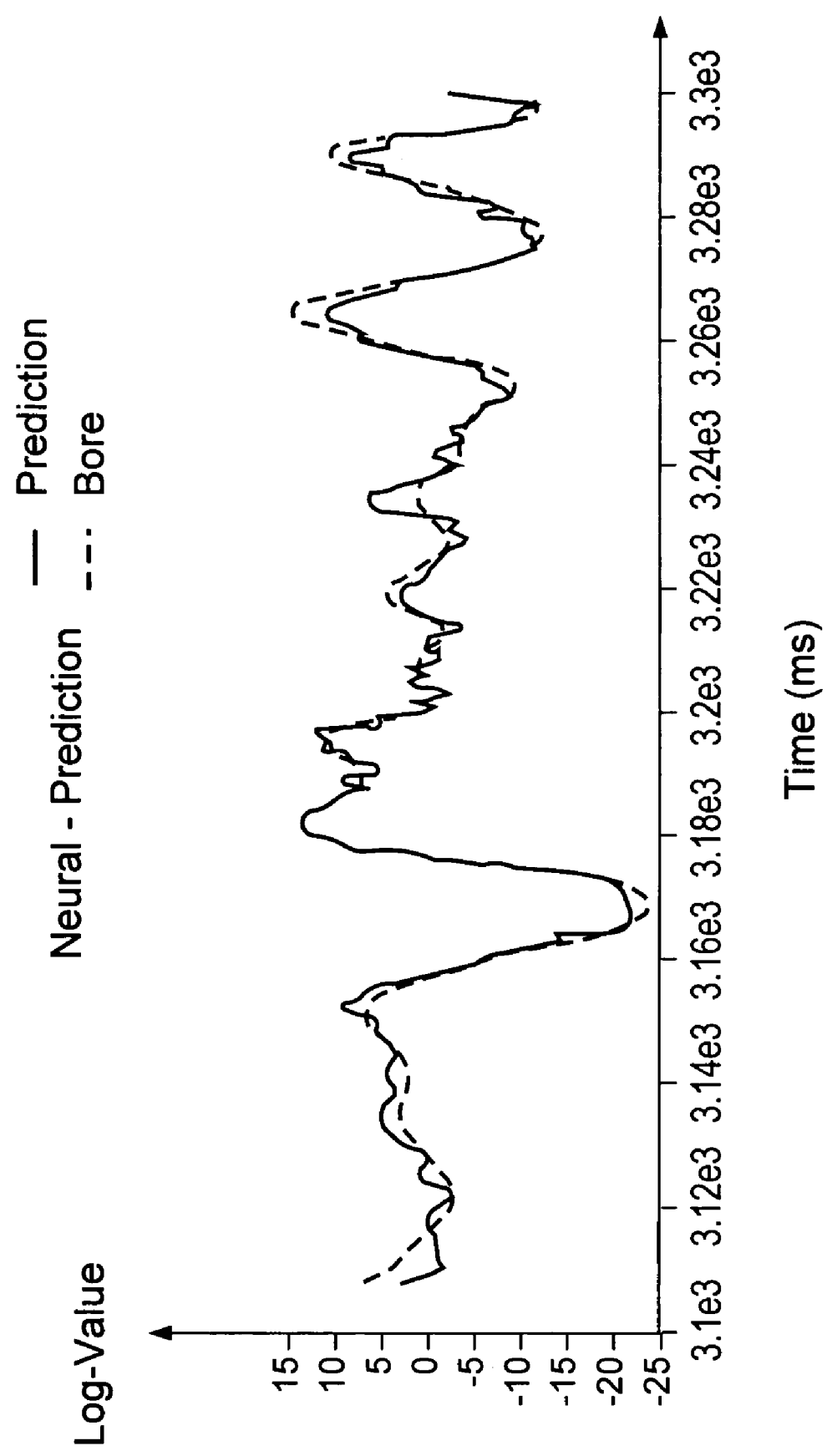

FIG. 7 shows the result of the estimation of an electric recording realized by the neural network and applied to the best keying point.

COMPLETE DESCRIPTION

The method according to the invention is a method for keying a borehole in a seismic block. With reference to the figures, an embodiment of this method is given below.

A seismic acquisition permits the production of a seismic block the purpose of which is to represent the volume of subsoil through which the seismic wave has travelled. A seismic block is constituted by a set of seismic traces that have been summed, that is to say pre-processed in order to obtain the best possible view of the underground reflectors.

The reflectors are interfaces between two media presenting different speeds for the seismic wave. The reflectors generally represent limits of geological layers.

Let B be a seismic block. The seismic block is defined by a three-dimensional matrix M. Two dimensions of the block B are linked to two horizontal spatial axes. commonly called (Ox, Oy). The third dimension of the block B is linked to a vertical temporal axis, commonly called OL.

As the seismic block is an image of the subsoil, each element of the matrix M is associated with a point with coordinates $(x_{bi}, y_{bi}, z_{bi})$ in the subsoil. The time component $t_{bi}$ is linked to the depth $zb_i$ by a relationship of the type:

$$zb_i = v(tb_i) * tb_i$$

where $v(tb_i)$ is a function which gives the speed of the seismic wave as a function of the depth.

Each element of the matrix M contains a seismic attributes vector $(A_{i1}, A_{i2} \ldots A_{in})$ at the point with coordinates $(xb_i, yb_i, tb_i)$. For example, the attributes $(A_{i1}, A_{i2} \ldots A_{in})$ measure the energy of the seismic wave, also called seismic amplitude.

The term offset refers to the distance which separates the transmitter-receiver pair associated with a seismic trace. A seismic amplitude measurement is then determined by the summation of the seismic amplitude measurements according to predetermined classes of offsets. Typically, the traces will be summed according to a division into three classes of offsets: near offsets, far offsets and very far offsets.

Let F be a borehole drilled in the volume of subsoil covered by seismic block B. The bore F travels through the subsoil along a drilling trajectory defined by a set of points with spatial coordinates $(xf_i, yf_i, zf_i)$.

Any oil exploration drilling gives rise to the recording of numerous electric measurements in the depth of the bore. For each point with coordinates $(xf_i, yf_i, zf_i)$ of the trajectory of the borehole, a set of electric measurements $(E_1, E_2, \ldots E_n)$ is thus acquired.

The dimension of the depths $zf_i$, is the unit of length; the measurements are taken in meters or in feet. A first operation to place the bore in the seismic block is to transform the length value into a time value. This transformation is easily carried out with the help of relationship (1) since the rates of propagation of the seismic wave in the subsoil in the neighbourhood of the bore can be measured, these rates being measured directly in the borehole.

The result of the conversion is a temporal bore trajectory defined by a set of points U with spatial coordinates $(xf_i, yf_i, zf_i)$.

The bore is then locked into the seismic block by the initial coordinates of its trajectory or surface coordinates $(xf_o, yf_o, tf_o)$.

Figure 1:
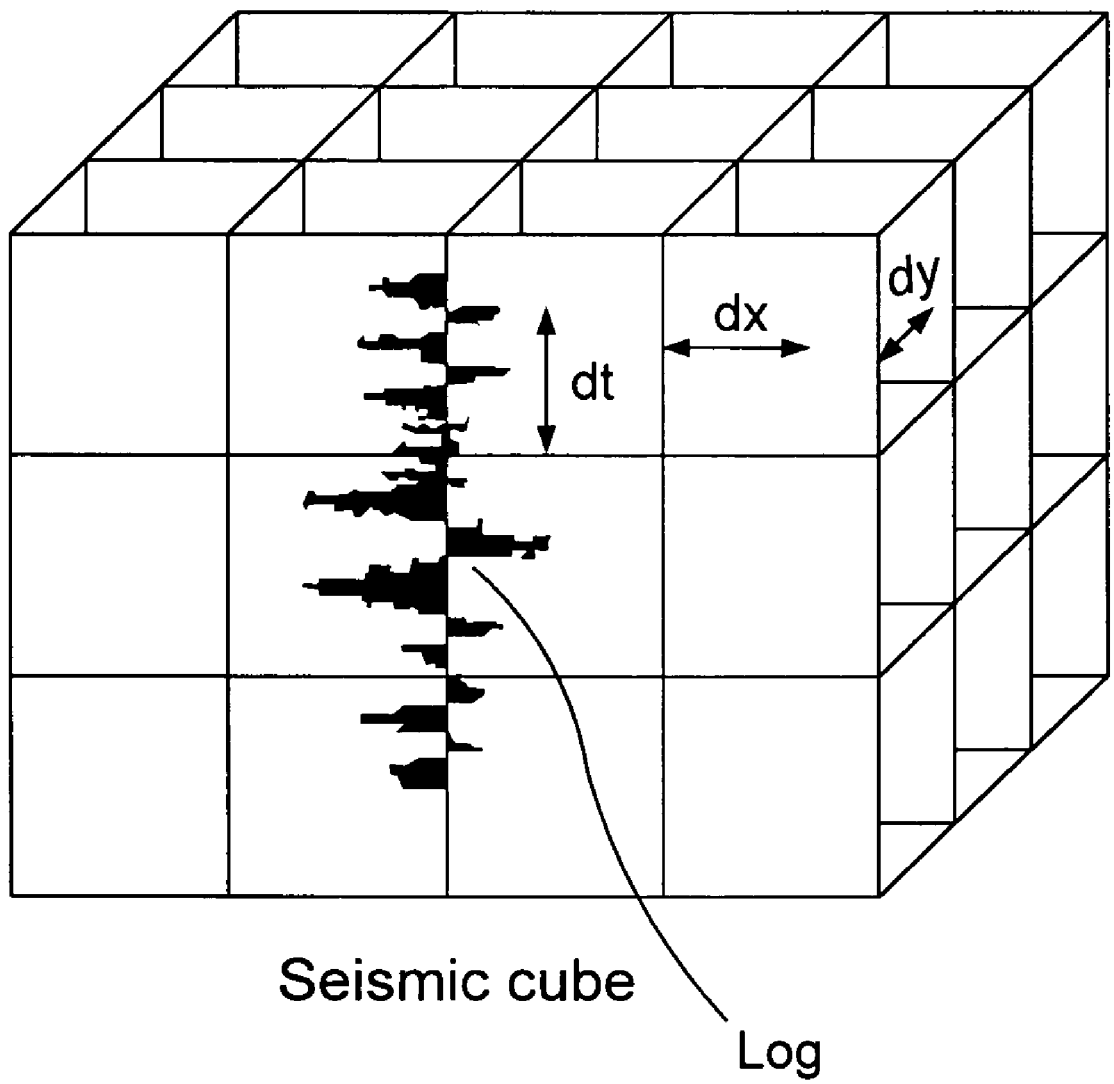
FIG. 1 represents an electric signal positioned in a seismic block.

FIG. 1 shows schematically a portion of a seismic block (seismic cube) presenting steps in space dx and dy in the two horizontal dimensions and a step in time dt in the vertical dimension. An electric signal (Log) is placed in the portion of the block.

As electric recordings in boreholes are generally carried out every foot and the resolution of a seismic signal, a function of its pass-band, is of the order of a few meters, it is advisable in a first step to re-sample the electric and seismic signals in such a way that their sampling steps in the time dimension are similar. To do this, all of the electric measurements of the bore Fare re-sampled and all of the seismic amplitude measurements of the block Bare over-sampled. In a second step, a filter is applied to the electric signals in order to bring them into a range of frequencies that is identical to that of the seismic signals.

Figure 2:
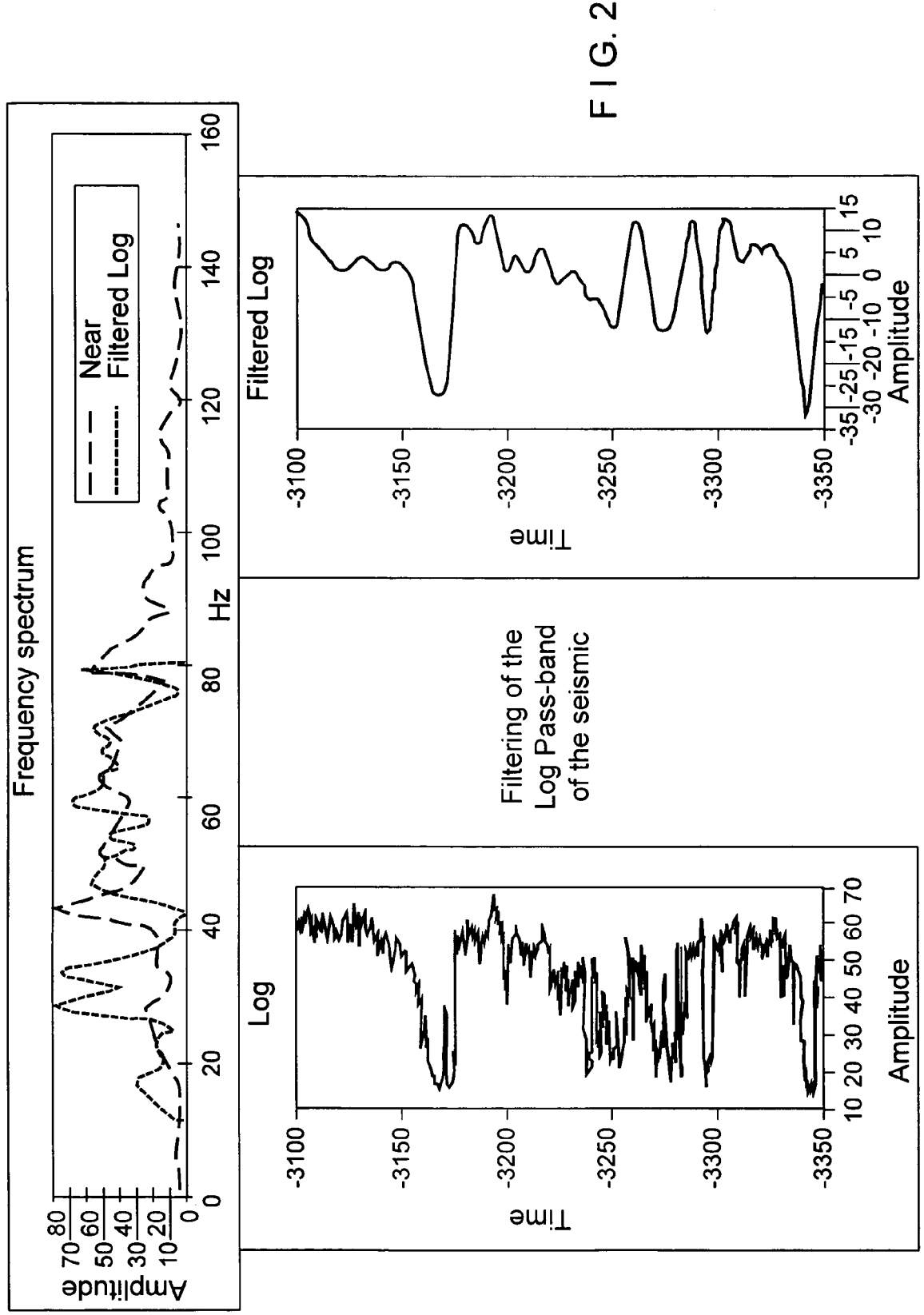
FIG. 2 illustrates the result of the filtering of an electric signal which adjusts its range of frequencies to that of the seismic signals.

FIG. 2 shows an example of filtering of an electric measurement. The left-hand rectangle called "Log" represents the amplitude of an electric signal sampled in time after application of the transformation (1). The right-hand rectangle called "Filtered Log" represents the electric signal the frequencies of which have been brought into the domain of the seismic frequencies by application of high-pass and low-pass filters. The top rectangle called "Frequency Spectrum", the horizontal axis of which graduates frequencies and the vertical axis amplitudes, shows the two frequency spectra associated with a seismic trace (Near) and with the filtered electric signal (Filtered Log). It can be seen that the electric signal which originally contained many more high frequencies than the seismic trace is now brought into the frequency domain of the seismic signal.

There is thus defined for each point U constituting the trajectory of the bore and associated with an electric measurement $E_i$ a spatia-temporal neighbourhood in the seismic block B in the form of a parallelepiped centred on the point U. Taking the seismic block B as an example, the parallelepiped has two horizontal spatial sides and one vertical time dimension, orthogonal to the spatial side. Let Dvx be the number of locations of the neighbourhood on the axis Ox, Dvy the number of locations of the neighbourhood on the axis Oy and Dvt the number of locations of the neighbourhood on the axis Ot.

There will be chosen, for an example, a dimension of the parallelepiped of 5 samples either side of the point U in each dimension. In this case Dvx, Dvy and Dvt all take 11 as a value and the neighbourhood is defined as a cube containing 1331 (11×11×11) seismic measurement points. The same neighbourhood applies to all the points of the trajectory, that is to say by extension to the trajectory itself. The neighbourhood is defined by a set of points V, The number of points included in the neighbourhood is called Npv. Npv is equal to the product Dvx×Dvy×Dvt and equals 1331 in the example above.

Npv layered neural networks are then produced. For a cube with 1331 points, 1331 neural networks are thus produced, The entry vector of each network is a vector of seismic amplitude measurements each component of which belongs to a different class of offsets. The exit of the network is reduced to a scalar representing an electric measurement Ej.

Figure 3:
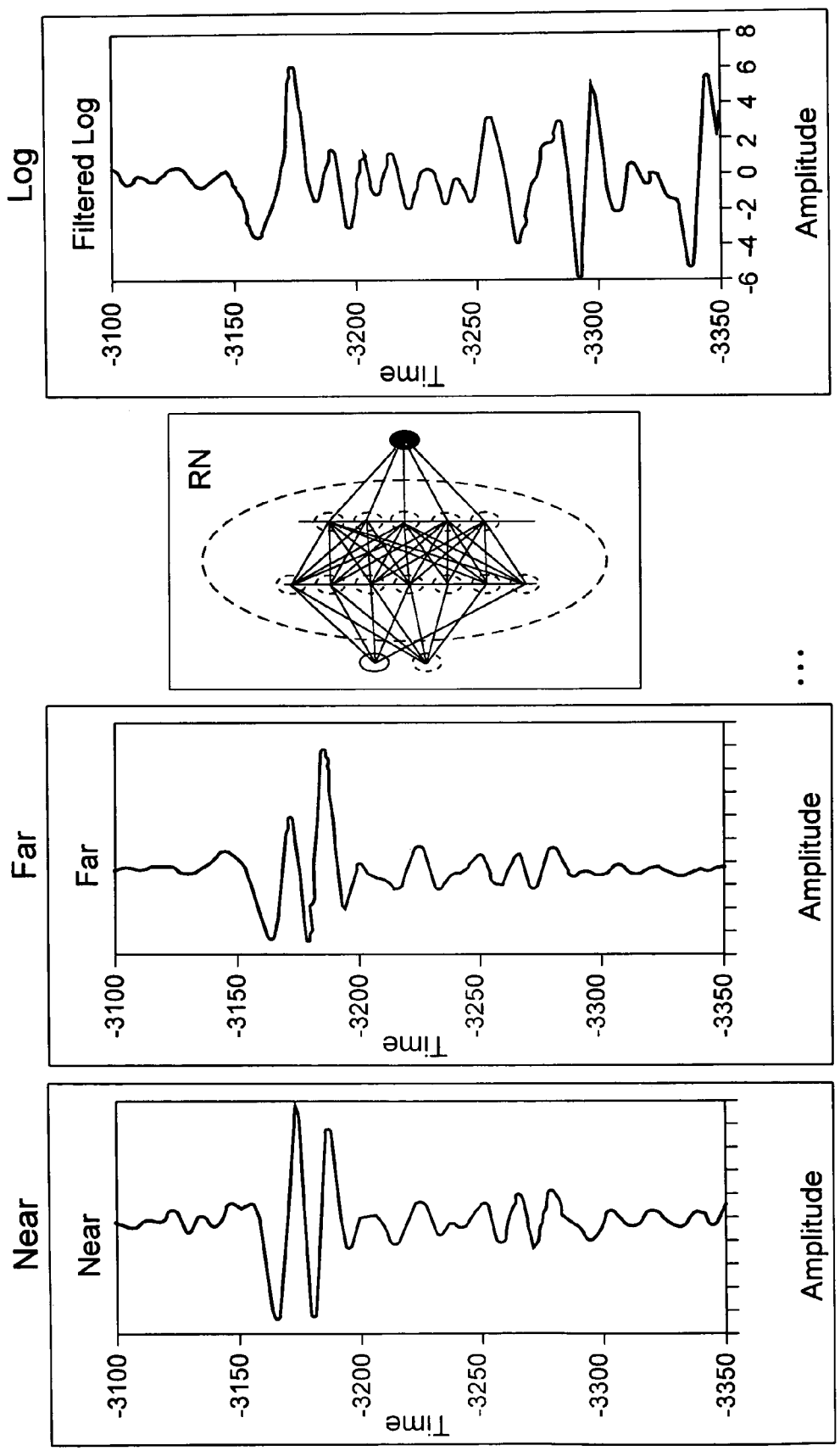
FIG. 3 represents a process diagram showing the functioning of the neural networks in the method according to the invention.

FIG. 3 provides a process diagram, In this example, the neural networks have two entries and one exit. The left-hand rectangle called "Near" shows the values taken by the first entry of the neural network in the learning set. The central rectangle called "Far" shows the values taken by the second entry of the neural network in the learning set. The right-hand rectangle called "Log" shows the values taken by the exit of the neural network in the learning set. An example is thus constituted by two entry values taken at a determined time (Time) on the "Near" and "Far" signals and an exit value taken at the same time on the _"Log" signal. The ellipse called "RN" is a symbolic representation of the neural network between entries and exit.

The purpose of the neural networks is thus to discover a relationship between the electric measurement EjU and the seismic measurements $(A_1^v, A_2^v, \ldots A_n^v)$, that is to say a function f such that:

$$E_i^U = f(A_1^v, A_2^v, \ldots A_n^v)$$

A measurement superscripted by u indicates that its value is taken on the trajectory of the bore and a measure superscripted by v indicates that its value is taken in the neighbourhood.

The neural networks all present the same architecture, that is to say the same number of hidden layers, the same number of neurons per layer, the same number of connections and the same initial conditions.

A position V in the neighbourhood is chosen. The neural network $RN^V$ associated with the position V is used as follows. For all the points U of the trajectory of the bore, a learning set is produced for the network $RN^V$ by collecting all the vectors of seismic amplitude measurements situated at position V. The learning set for the neural network $RN^V$ is thus constituted by as many examples as there are points U on the trajectory.

A predetermined number of iterations Nit is chosen and the learning phase of the neural network is launched by retro-propagation of the gradient.

When the Nit iterations are effected, the value of the integral $\Sigma^V$ of the function giving the quadratic error committed by the network on each iteration, from iteration 1 to iteration Nit is calculated.

A new position V' in the neighbourhood of the trajectory is then chosen and the previous steps are carried out with the neural network $RN^{V'}$ associated with the position V' in order to obtain a new integral $\Sigma^{V'}$.

The operation is thus repeated until all the points of the neighbourhood have been scanned. For a cube with 1331 points, 1331 integral values are thus obtained.

With a machine, these operations can be carried out sequentially with the same neural network reinitialized with each change of point in the neighbourhood. However, it is recommended to use this technique in parallel in machines with multi processors organized in calculation collectives, producing as many neural networks as the capacity of the machine configurations allows. The ideal would be to be able to obtain as many neural networks as there are points in the neighbourhood.

All the points of the neighbourhood having been travelled through, for each surface spatial position Vk of the neighbourhood with coordinates $(x_k, y_k, t_0)$ to the number of Dvx×Dvy, there is retained in the time dimension the pair of locations $V1_k (x_k, y_k, t_1)$, $(V2_k(x_k, y_k, t_2))$ of the neighbourhood which correspond to the two smallest local minima of the two integrals $(\Sigma^V 1_k, \Sigma^V 2_k)$.

Figure 4:
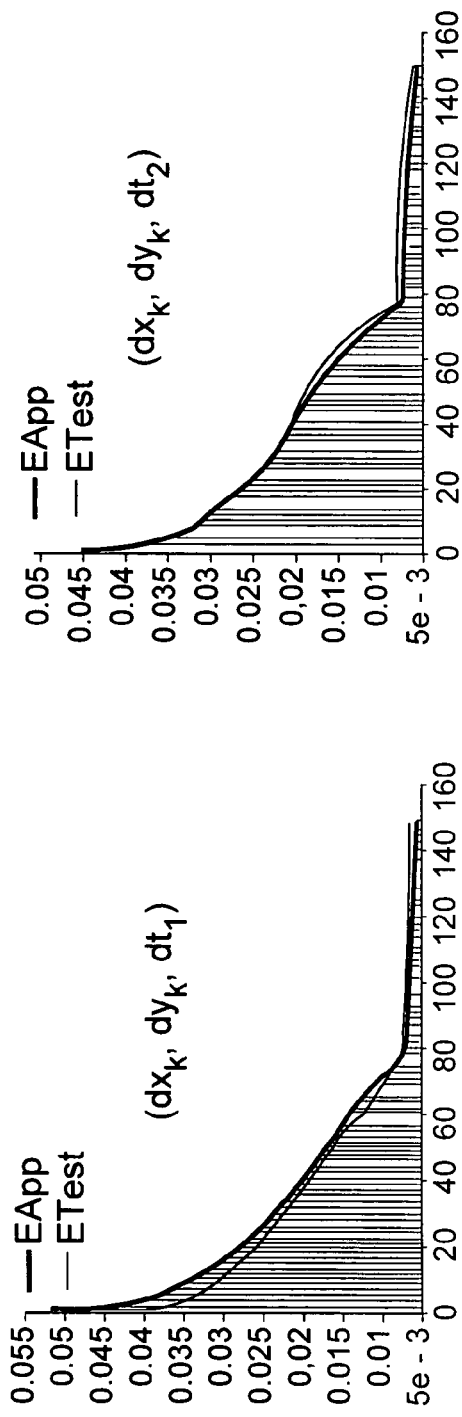
FIG. 4 shows four error functions associated with the learning phases of four layered networks.
Figure 4:
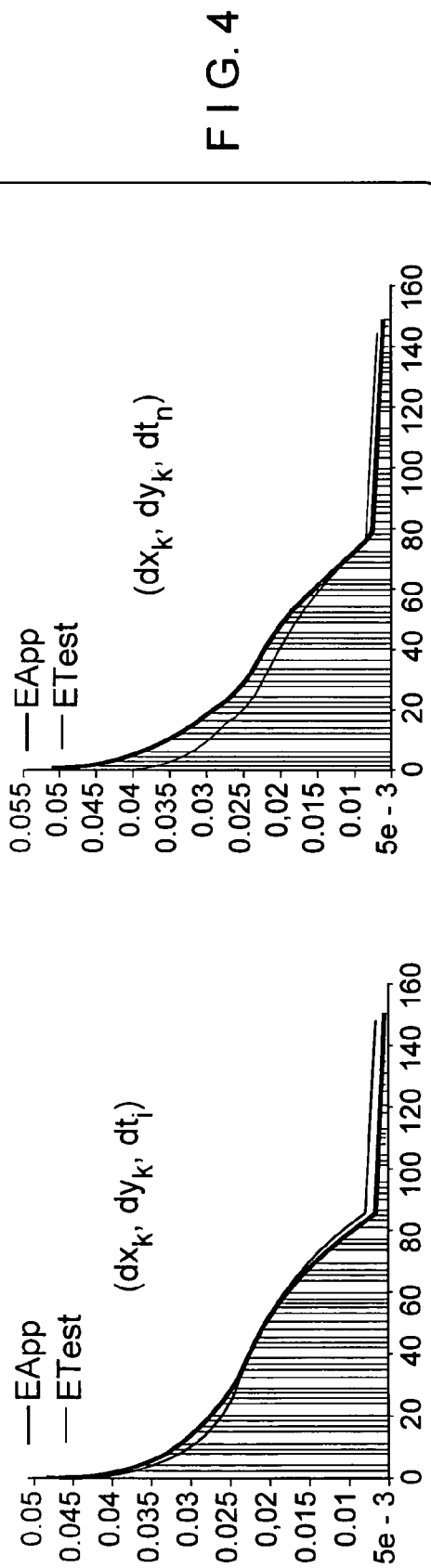

FIG. 4 shows four error functions associated with the learning phases of four identical neural networks. The horizontal axes are graduated in iterations and the vertical axes give the quadratic errors committed by the networks during their estimation of the electric signal. The values of the four integrals associated with the networks are equal to the hatched surfaces. In this example, these are the networks identified by the triplets $(dx_k, dy_k 1, dt_1)$ and $(dx_k, dy_k, dt_2)$ which present the two smallest local minima of the integrals.

The variance of the signal estimated by the neural networks $RN^{v1}_k$ and $RN^{v2}_k$ is then calculated and the position $V_m$ for which the variance is maximum is retained in the pair $V1_k (x_k, y_k, t_1)$, $(V2_k(x_k, y_k, t_2))$. Thus a set composed of Dvx×Dvy locations $V_m$ in the neighbourhood is defined.

Figure 5:
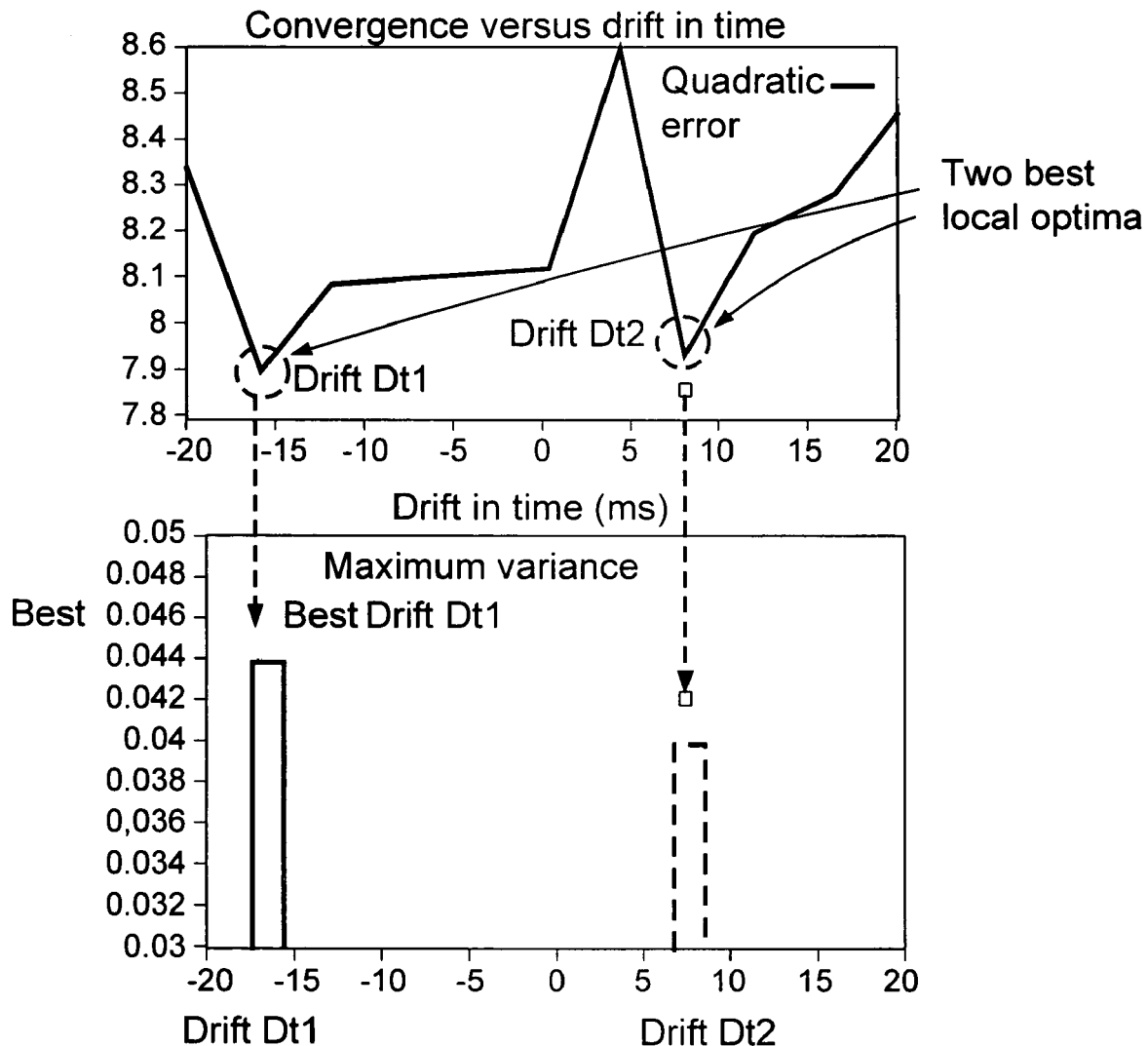
FIG. 5 illustrates the principle of selection of the best time drift.

FIG. 5 shows how the selection of the position $V_m$ is made from the positions $V_k$. The upper rectangle gives the values of integrals as a function of the shift on the temporal axis for a chosen $V_k$. In this example, the temporal neighbourhood is fixed at 20 temporal samples either side of a point of the trajectory. The drifts DE1 and DE2 correspond to the two smallest local minima of the integrals. The lower rectangle represents the values of the variances of the two signals estimated by the neural networks associated with the drifts DE1 and DE2. The drift DE1 is retained as the best keying $V_m$ for the surface position $V_k$.

Finally, from among all the Dvx×Dvy locations $V_m$, the position $V_{cal}$ for which $\Sigma^V_m$ is minimum is chosen. The position $V_{cal}$ is the position of the neighbourhood which ensures the best keying of the electric signal on the seismic signals.

Another embodiment involves not informing the neural networks by a single measurement per class of offsets, but by a set of M values taken in a time sampling window on the trace, which window is centred on a point V of the neighbourhood. A time window equal to 8 samples either side of the point V, that is to say 17 time values, will be taken for example.

FIG. 6 presents such a network for which the chosen time window is 2 samples either side of the point V for reasons of simplicity. The network thus has 5 entries per class of offsets.

The figure shows two classes of near (Near) and far (Far) offsets which generate 2×5 entries.

This modifies the architecture of the network which thus comprises an entry vector the dimension of which increases from N to N×M. The exit of the network remains scalar.

The method according to the invention then applies in identical fashion and leads to the selection of the best point of the neighbourhood as the best keying possible. This windowing technique has the advantage of permitting the network to carry out a deconvolution on the basis of the duration of the seismic pulse transmitted in the subsoil. The quality of the results is thereby greatly improved.

FIG. 7 shows the result of the estimation of the electric recording (Prediction) realized by the neural network from the seismic signals and applied to the best keying point. The dotted line (bore) represents the electric signal that is effectively measured. The very great quality of the estimation, which affirms the quality of the keying determined by the method according to the invention, will be noted.

What is claimed is:

1. A method of keying, in a space presenting two spatial dimensions and one temporal dimension, a signal S measured in positions U subject to an uncertainty, from a set of N signals measured in determined positions, the N+1 signals having their temporal origin in a same plane, said method comprising the steps of re-sampling the N+1 signals in order to place them all in an identical sampling range;

filtering the signal S in order to place it in a range of frequencies that is identical to that of the N signals;

defining for each position U associated with the measurements of the signal S a same neighbourhood of places V in the spatio-temporal space centred on the position U;

producing a layered neural network $RN^V$ for each location V in the neighbourhood of U, each network having an entry vector of dimension N associated with the measurements of the N signals and a scalar exit associated with a measurement of the signal S;

for each neural network $RN^V$, defining a learning set such that the entries are the collection of all the vectors of measurements of the N signals situated at the locations V and the exits are the collection of the values of the signal S at the positions U for all the positions U;

fixing a predetermined number of iterations Nit for all the neural networks and launching the learning phases of all the networks;

for each neural network $RN^V$, calculating the value of the integral $\Sigma^V$ of the function giving the error committed by the network at each iteration, from iteration 1 to iteration Nit;

for each surface spatial position $V_k$ of the neighbourhood with coordinates $(x_k, y_k, t_0)$ selecting in the time dimension the pair of locations $V1_k(x_k, y_k, t_1)$, $V2_k(x_k, y_k, t_2)$, of the neighbourhood which correspond to the two smallest local minima of the two integrals ($\Sigma^{v1}_k$, $\Sigma^{v2}_k$);

for each surface spatial position $V_k$ of the neighbourhood, retaining from among the two positions $V1_k(x_k, y_k, t_1)$, $V2_k(x_k, y_k, t_2)$ the position $V_m$, for which the signal estimated by the respective neural networks $RN^{v1}_k$ and $RN^{v2}_k$ presents a maximum variance; and choosing from among the positions $V_m$ the position $V_{cal}$ for which the integral $\Sigma^v_m$ is minimum.

2. The method according to claim 1, wherein the use of the neural networks comprises:

defining for each position U associated with the measurements of the signal S a same neighbourhood of places V in the spatia-temporal space centred on the position U;

producing a layered neural network $RN^v$ for each location V in the neighbourhood of U. each network having an entry vector of dimension N×M associated with the measurements on a time window of size M centred on V of the N signals and a scalar exit associated with a value of the signal S;

for each neural network, defining a learning set such that the entries are the collection of all the vectors of measurements taken in a time window of size M centred on V for the N signals and the exits are the collection of the values of the signal S at the positions U for all the positions U;

fixing a predetermined number of iterations Nit for all the neural networks and launching the learning phases of all the networks;

for each neural network $RN^v$, calculating the value of the integral $\Sigma^v$ of the function giving the error committed by the network at each iteration, from iteration 1 to iteration Nit;

for each surface spatial position Vk of the neighbourhood with coordinates $(x_k, y_k, t_0)$, selecting in the time dimension the pair of locations $V1_k(x_k, y_k, t_1)$, $V2_k(x_k, y_k, t_2)$, of the neighbourhood which correspond to the two smallest local minima of the two integrals ($\Sigma^{v1}_k$, $\Sigma^{v2}_k$);

for each surface spatial position $V_k$ of the neighbourhood, retaining from among the two positions $V1_k(x_k, y_k, t_1)$, $V2_k(x_k, y_k, t_2)$ the position $V_m$, for which the signal estimated by the respective neural networks $RN^{v1}_k$ and $RN^{v2}_k$ presents a maximum variance; and choosing from among the $V_m$ positions the position $V_{eal}$ for which the integral $\Sigma^v_m$ is minimum.

* * * * *